(12) United States Patent
Haley et al.

(10) Patent No.: US 8,581,982 B1
(45) Date of Patent: Nov. 12, 2013

(54) INFRARED CAMERA VEHICLE INTEGRATION SYSTEMS AND METHODS

(75) Inventors: Darren M. Haley, Santa Barbara, CA (US); William A. Terre, Santa Barbara, CA (US); Jeff Frank, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 1564 days.

(21) Appl. No.: 11/830,682

(22) Filed: Jul. 30, 2007

(51) Int. Cl.
*H04N 7/18* (2006.01)

(52) U.S. Cl.
USPC ............................... 348/148; 362/545

(58) Field of Classification Search
USPC ............................... 348/148; 362/545
See application file for complete search history.

(56) References Cited

U.S. PATENT DOCUMENTS

| | | | | |
|---|---|---|---|---|
| 6,151,065 A * | 11/2000 | Steed et al. | | 348/148 |
| 6,320,612 B1 * | 11/2001 | Young | | 348/148 |
| 6,672,745 B1 * | 1/2004 | Bauer et al. | | 362/545 |
| 7,156,542 B2 * | 1/2007 | Miller et al. | | 362/466 |
| 2004/0114379 A1 * | 6/2004 | Miller et al. | | 362/464 |
| 2004/0160786 A1 * | 8/2004 | Bauer et al. | | 362/545 |
| 2004/0201673 A1 * | 10/2004 | Asai | | 348/148 |
| 2005/0002202 A1 * | 1/2005 | Holz | | 362/539 |
| 2005/0182540 A1 * | 8/2005 | Sugiura et al. | | 701/41 |
| 2005/0276059 A1 * | 12/2005 | Rodriguez Barros et al. | | 362/494 |
| 2006/0049350 A1 * | 3/2006 | Teich et al. | | 250/330 |
| 2007/0090985 A1 * | 4/2007 | Jess et al. | | 341/155 |
| 2009/0254236 A1 * | 10/2009 | Peters, II | | 701/28 |
| 2010/0238288 A1 * | 9/2010 | Klaerner et al. | | 348/148 |

OTHER PUBLICATIONS

Wieringa, F.P.; Matik, F; Duncker, D.J.G.M.; Bogers, A.J.J.C.; Zeelenberg, C.; van der Steen, A.F.W; Remote optical stereoscopic multispectral imaging during cardiac surgery, Sep. 17-20, 2006, IEEE, pp. 693-696.*

* cited by examiner

*Primary Examiner* — El Hadji Sall
(74) *Attorney, Agent, or Firm* — Haynes and Boone, LLP

(57) ABSTRACT

Systems and methods are disclosed in accordance with some embodiments for integrating an infrared camera system into a vehicle's lighting component. For example in accordance with an embodiment, a lighting component for a vehicle includes a housing; an infrared camera disposed within the housing; a light source disposed within the housing and disposed at least partially around the infrared camera; and a lens coupled to the housing and adapted to allow infrared radiation to pass through and be received by the infrared camera and to allow light provided by the light source to be transmitted through the lens. Furthermore, one or more infrared cameras may be integrated into a vehicle to provide various capabilities, such as for example stereoscopic infrared imaging, multi-spectral stereoscopic imaging (e.g., using infrared and visible wavelengths or various infrared wavelengths for multi-color infrared imaging), and/or provide various fields of view (e.g., foveal imaging).

30 Claims, 13 Drawing Sheets

INFRARED CAMERA VEHICLE INTEGRATION SYSTEMS AND METHODS

TECHNICAL FIELD

The present invention relates generally to infrared cameras and, more particularly, to techniques for vehicle integration of infrared cameras.

BACKGROUND

Infrared cameras and various types of systems incorporating an infrared camera are well known and applied in a wide variety of applications to view and/or record images. A typical application of an infrared camera system is to provide surveillance, such as for perimeter and facility security, or general area awareness of a given area, such as to provide enhanced visibility for a driver or other occupant of a vehicle.

A conventional infrared camera system implementation may have a number of potential drawbacks. For example, it may be desirable to incorporate an infrared camera system into various types of vehicles, with a typical approach being to include the infrared camera system as a separate module to be secured independently to the vehicle. However, this may not be desirable for various reasons, including vehicle design considerations, aesthetics, or space issues.

An alternative conventional approach may be to replace a component of the vehicle with a similar component that is configured to allow the infrared camera system to be externally attached. As a specific example, the infrared camera system may be designed to attach to a common component (e.g., a brake light) whose general design may vary from one type of vehicle to the next. However, this approach of attaching the infrared camera system to the component, such as "add-on equipment" to existing hardware, may be costly in terms of complexity to account for the various component designs and/or in terms of the amount of space required and associated expenses.

As a result, there is a need for improved techniques for integrating an infrared camera system into a vehicle.

SUMMARY

Systems and methods are disclosed in accordance with one or more embodiments of the present invention for integrating infrared camera systems into various types of vehicles. For example in accordance with an embodiment, an infrared camera system is disclosed that is adapted to be incorporated into a vehicle's lighting component (e.g., a light or a reflector), where the lighting component may represent for example a common module resident on various types of vehicles (e.g., within a family or vehicle product line). The infrared camera system, as an example, may provide a through-the-lens imaging approach and may be field installable and replaceable (e.g., based on existing mounting availability and location), with minimal wiring modifications. Furthermore, one or more infrared camera systems may be integrated into a vehicle to provide various capabilities, such as for example stereoscopic infrared imaging, multi-spectral stereoscopic imaging (e.g., using infrared and visible wavelengths or various infrared wavelengths for multi-color infrared imaging), and/or provide various fields of view (e.g., foveal imaging).

More specifically in accordance with one embodiment of the present invention, a lighting component for a vehicle includes a housing; an infrared camera disposed within the housing; a light source disposed within the housing and disposed at least partially around the infrared camera; and a lens coupled to the housing and adapted to allow infrared radiation to pass through and be received by the infrared camera and to allow light provided by the light source to be transmitted through the lens.

In accordance with another embodiment of the present invention, a vehicle has at least one lighting component that includes a housing; an infrared camera disposed within the housing; means disposed within the housing and adjacent to the infrared camera for providing light; and means for enclosing the housing, wherein the enclosing means includes a lens adapted to allow infrared radiation through to be received by the infrared camera and to allow light generated by the light providing means to be transmitted through the lens.

In accordance with another embodiment of the present invention, a method of reconfiguring an existing vehicle component to provide a driver vision enhancer module includes removing an existing lens from a housing of the existing vehicle component; removing any existing lighting components and associated hardware from the housing; installing in the housing an infrared camera along with one or more light sources adjacent to the infrared camera; and securing a lens to the housing, wherein the lens is adapted to allow infrared radiation to pass through and be received by the infrared camera and to allow light provided by the light sources to be transmitted through the lens.

In accordance with another embodiment of the present invention, a method of providing infrared imaging capability for a vehicle includes providing one or more lighting components on the vehicle, wherein the lighting component includes an infrared camera, a light source adjacent to the infrared camera, and a lens adapted to allow infrared radiation through to be received by the infrared camera and to allow light generated by the light source to be transmitted through the lens; processing infrared image data from the infrared camera to provide processed infrared image data; and displaying the processed infrared image data to an occupant of the vehicle.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1b shows a front view illustrating one of the conventional lights of the vehicle of FIG. 1a.

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
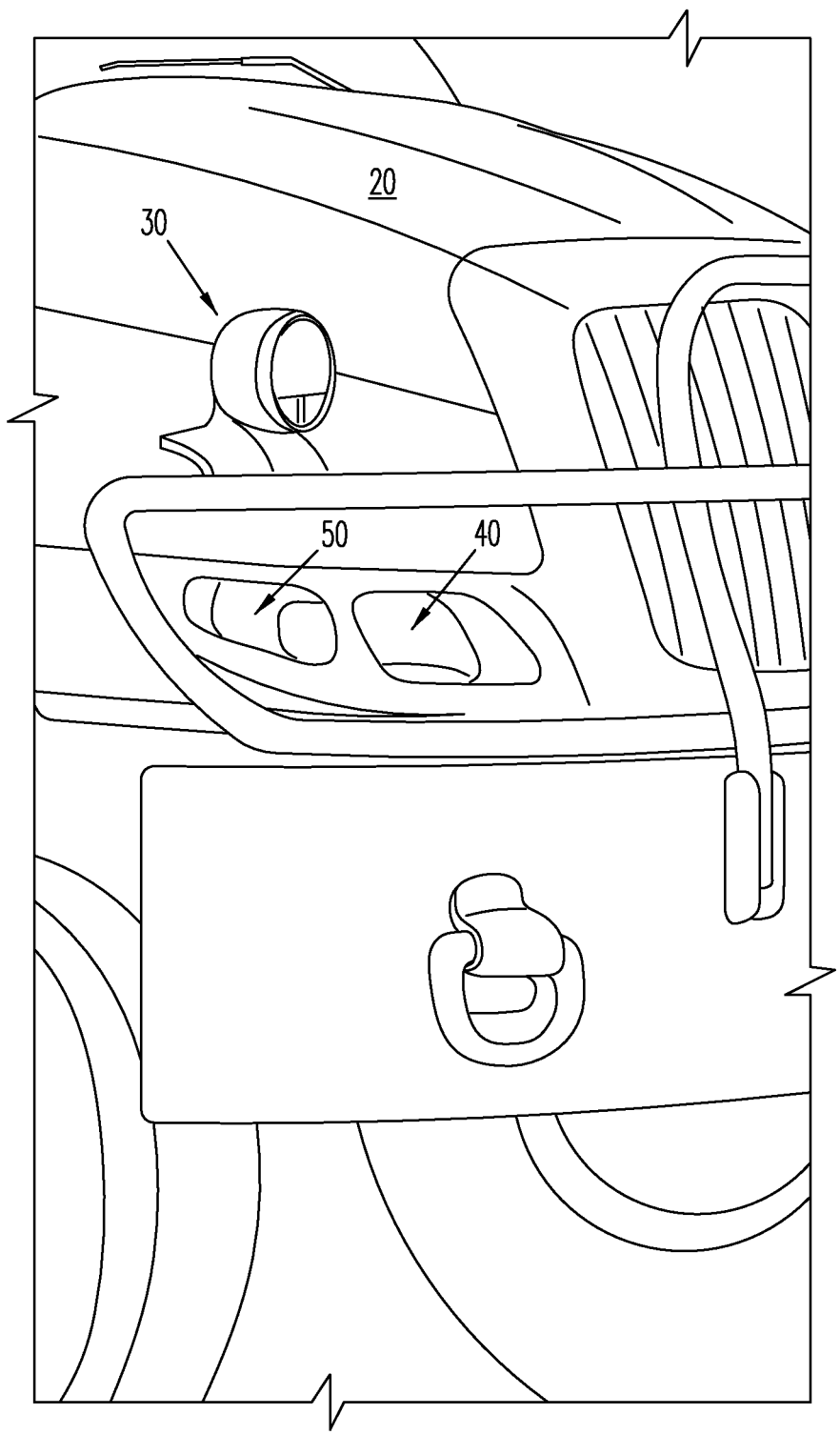
FIG. 1a shows a partial perspective view illustrating a vehicle with conventional lights.
Figure 1B:
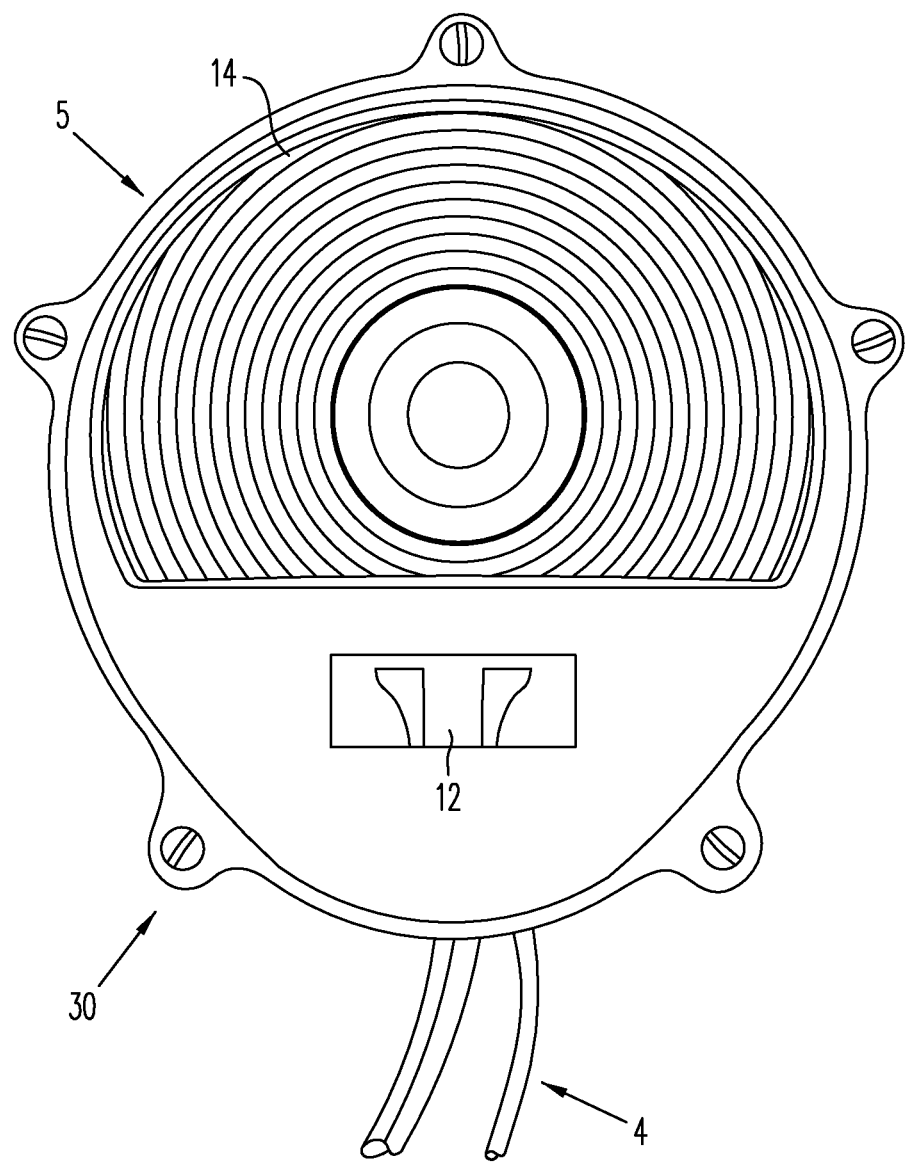
Figure 1C:
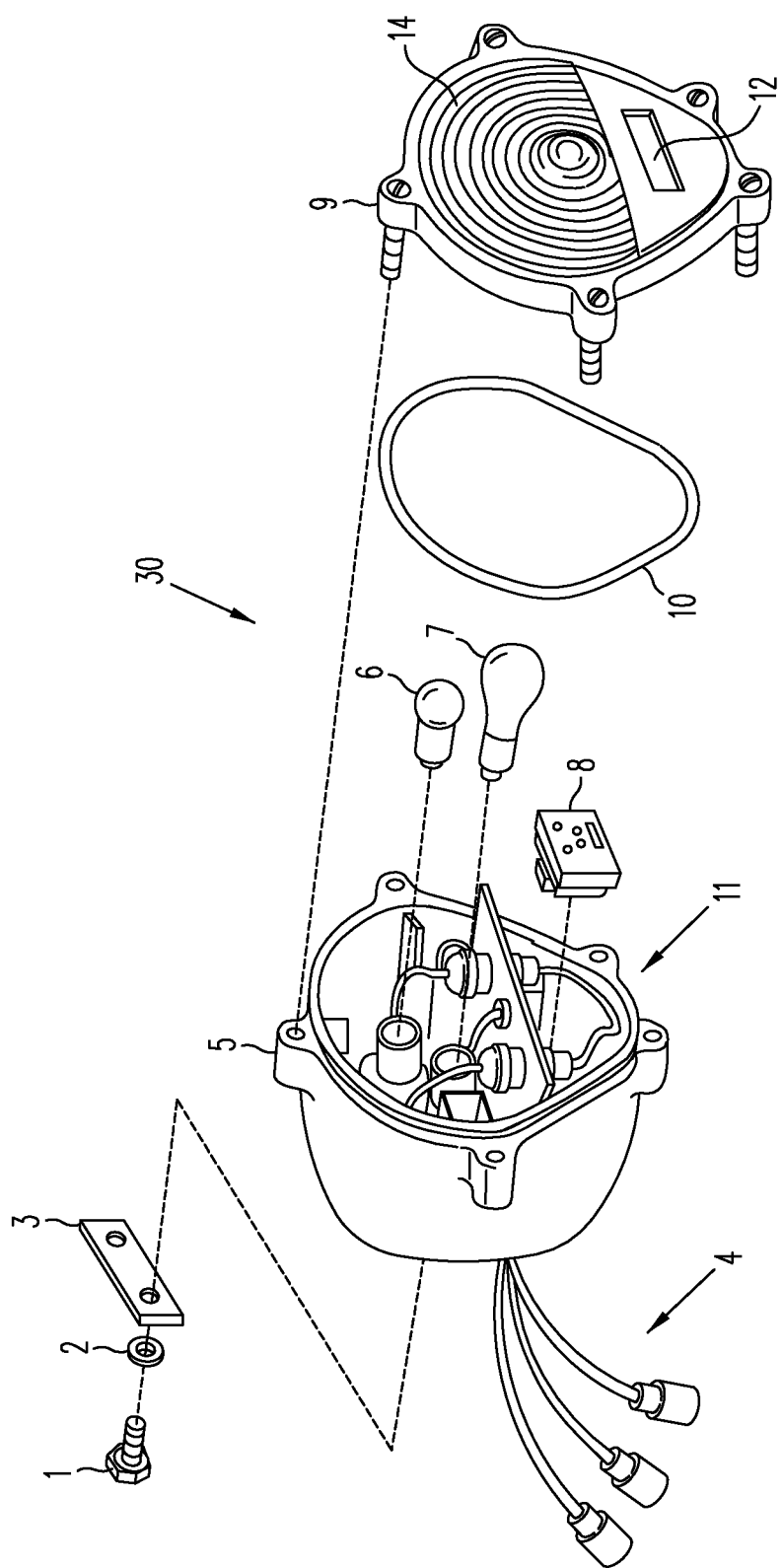
FIG. 1c shows an exploded perspective view of the conventional light of FIG. 1b.

FIG. 1a shows a partial perspective view illustrating a vehicle 20 with conventional lights. Vehicle 20 includes a number of different lights, such as a turn signal light 30, headlights 40, and a reflector 50. As an example, FIG. 1b shows a front view of turn signal light 30, while FIG. 1c shows an exploded perspective view of turn signal light 30 of FIG. 1a.

Turn signal light 30 may include a housing 5 for a running light bulb 6, a turn signal light bulb 7, a blackout reflector 8, and associated hardware 11 (e.g., light bulb sockets, support brackets, wire terminals, etc.). Blackout reflector 8 is optional for this example and may represent a reflector that is visible (e.g., to the naked eye or with an infrared camera) when vehicle 20 is operated under low light conditions and without the vehicle's lights switched on. A lens bracket 9, for a lens 14 and a window 12 (for blackout reflector 8), is secured to housing 5 (e.g., with screws) and may include a gasket 10 to provide a weatherproof seal. Electrical wires 4 are routed through housing 5 and various hardware (e.g., a bolt 1, nut 2, and bracket 3) may be used to secure turn signal light 30 to vehicle 20.

As noted previously, a typical approach for including an infrared camera system with vehicle 20 would be to mount the infrared camera onto vehicle 20 (e.g., attach it to turn signal light 30) or replace a component of vehicle 20 with a larger component that would include the infrared camera. For example, turn signal light 30 may be replaced with a larger turn signal light component to provide room for an infrared camera lens and associated infrared camera components adjacent to lens 14. However, as noted above, this may not be desirable for various reasons, such as in terms of additional space and weight of the larger component, additional space required, manufacturing costs, and/or design considerations.

In contrast in accordance with one or more embodiments of the present invention, systems and methods are disclosed for integrating infrared camera systems into a vehicle. For example in accordance with some embodiments of the present invention, an infrared camera system is integrated into a vehicle's lighting component, such as a light or a reflector, to provide a through-the-lens infrared camera system configuration. The techniques disclosed herein may allow for the infrared camera system to be integrated into the existing lighting component, without the resulting size increase of the component and/or other drawbacks of conventional approaches. The vehicle's lighting component may represent, for example, a common module resident on various types of vehicles (e.g., within a vehicle family or product line), with the through-the-lens imaging approach being field installable and replaceable (e.g., based on existing mounting availability and location) with minimal wiring modifications, as discussed for example further herein.

Figure 2A:
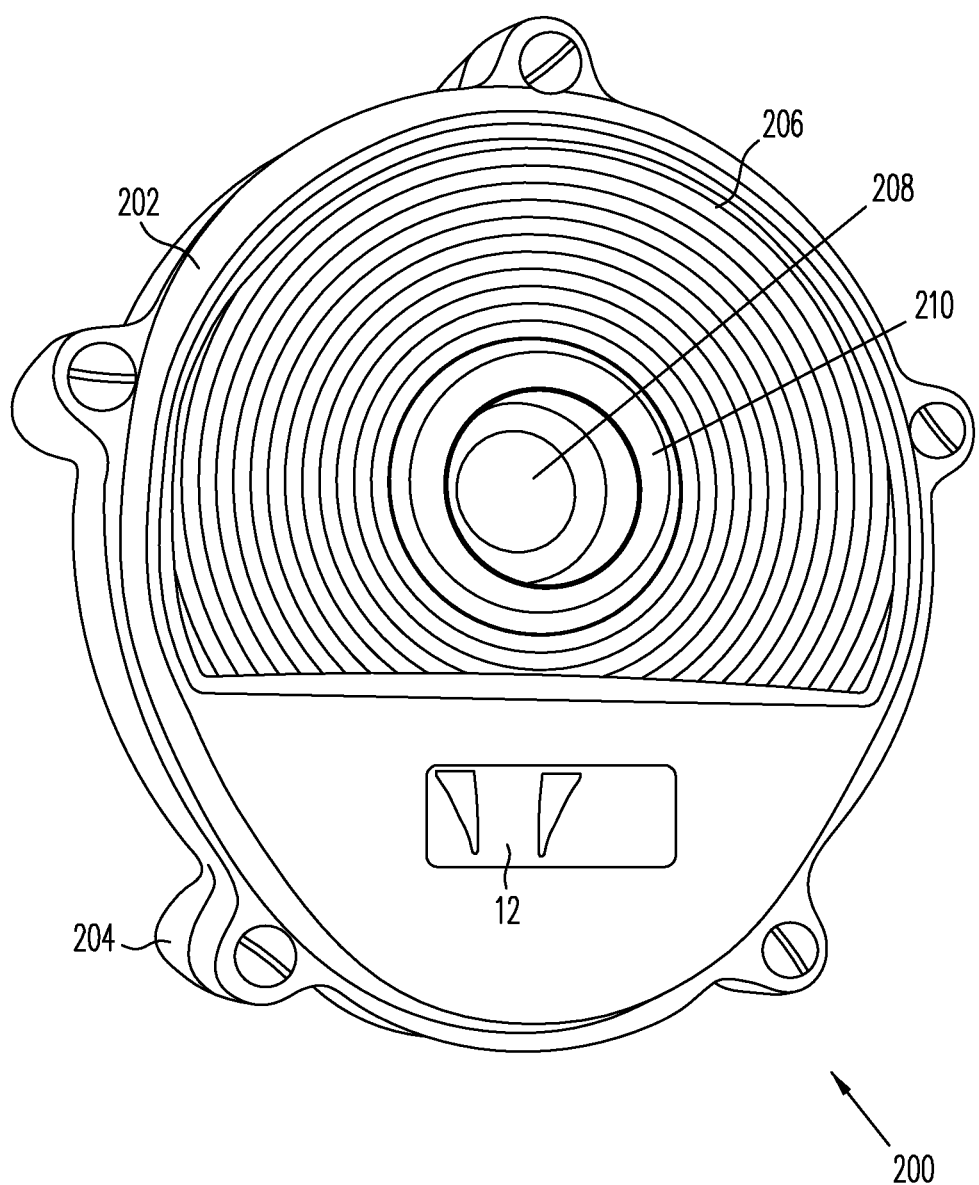
FIGS. 2a and 2b show front views illustrating lights with integrated infrared cameras in accordance with embodiments of the present invention.
Figure 2B:
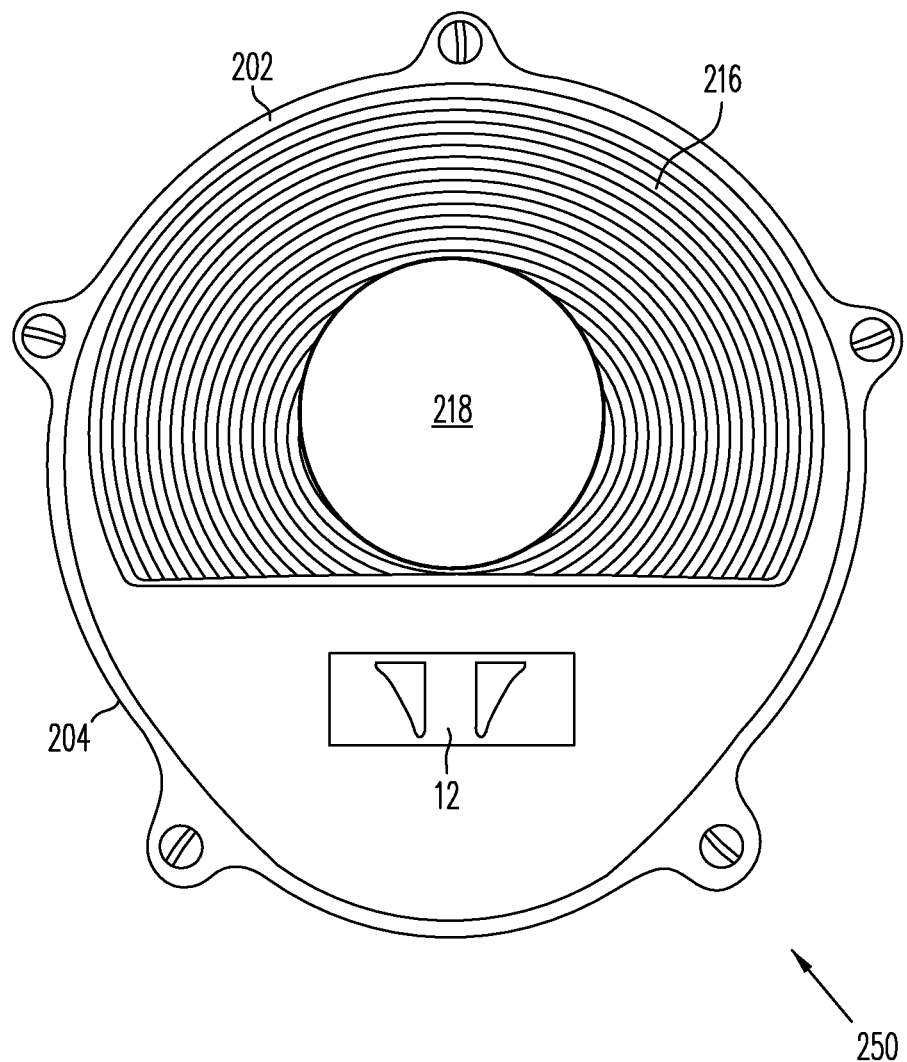

As a specific implementation example, FIGS. 2a and 2b show front views illustrating lights 200 and 250, respectively, with integrated infrared cameras in accordance with embodiments of the present invention. Lights 200 and 250, for example, may represent a modified version of turn signal light 30 (FIGS. 1a-1c) that incorporates the techniques disclosed herein in accordance with one or more embodiments of the present invention. However, this is not limiting as it should be understood that the techniques disclosed herein may be applied to any type of lighting component (e.g., a light or a reflector) on a vehicle. For example, the vehicle may represent a ground vehicle (e.g., an automobile, a truck, or a motorcycle), a watercraft (e.g., a boat, a ship, or a submersible), or an aircraft (e.g., an airplane or a spacecraft). The lighting component may represent, for example, a side view mirror, a turn signal, a headlight, a taillight, a spotlight, a fog light, a running light, an accessory light, a safety light, a reflector, or any other lighting component that would allow a through-the-lens imaging configuration. The lighting component, with integrated infrared camera providing the through-the-lens imaging configuration, is also referred to generally herein as a vision enhancer system (VES) module or driver vision enhancer (DVE) module.

Lights 200 and 250 include a lens bracket 202 (e.g., similar to lens bracket 9 of FIG. 1c) and a housing 204 (e.g., similar to housing 5 of FIG. 1c). Lens bracket 202 optionally includes window 12 for blackout reflector 8, as discussed in reference to FIGS. 1b and 1c, and further includes a lens 206 (FIG. 2a) or a lens 216 (FIG. 2b) in accordance with one or more embodiments of the present invention.

Lens 206 (FIG. 2a) provides an opening through which an infrared camera lens 208 (e.g., of an infrared camera system) has a desired field of view for receiving infrared radiation. As an example, lens 206 (e.g., with a grommet 210) provides a weatherproof seal around infrared camera lens 208 and a weatherproof cover for housing 204.

Lens 250 (FIG. 2b) includes an infrared window 218 through which an infrared camera (not shown, within housing 204) has a desired field of view for receiving infrared radiation. Lens 216 may be integrated with infrared window 218 to provide a weatherproof cover for housing 204.

Lights 200 and 250 illustrate exemplary implementations, in accordance with some embodiments, for integrating an infrared camera within an existing lighting component of a vehicle or for providing a substitute lighting component that may have the same general size and shape (e.g., similar form factor) of the existing lighting component. The infrared camera is positioned within the lens structure of the lighting component to provide a through-the-lens imaging technique. As an example, any existing lighting hardware (if it exists) of the lighting component may be repositioned around the infrared camera or replaced with alternate hardware and source of illumination (e.g., light bulbs replaced with light-emitting diodes (LEDs)) that emits the desired light through the same lens structure that is used by the infrared camera. Thus, the techniques disclosed herein may provide certain advantages over conventional approaches, as noted herein, and may further provide a suitable lens arrangement (e.g., no removable lens cap is required for the infrared camera) and may maintain and not displace the optional blackout window 12 and reflector 8.

Figure 2C:
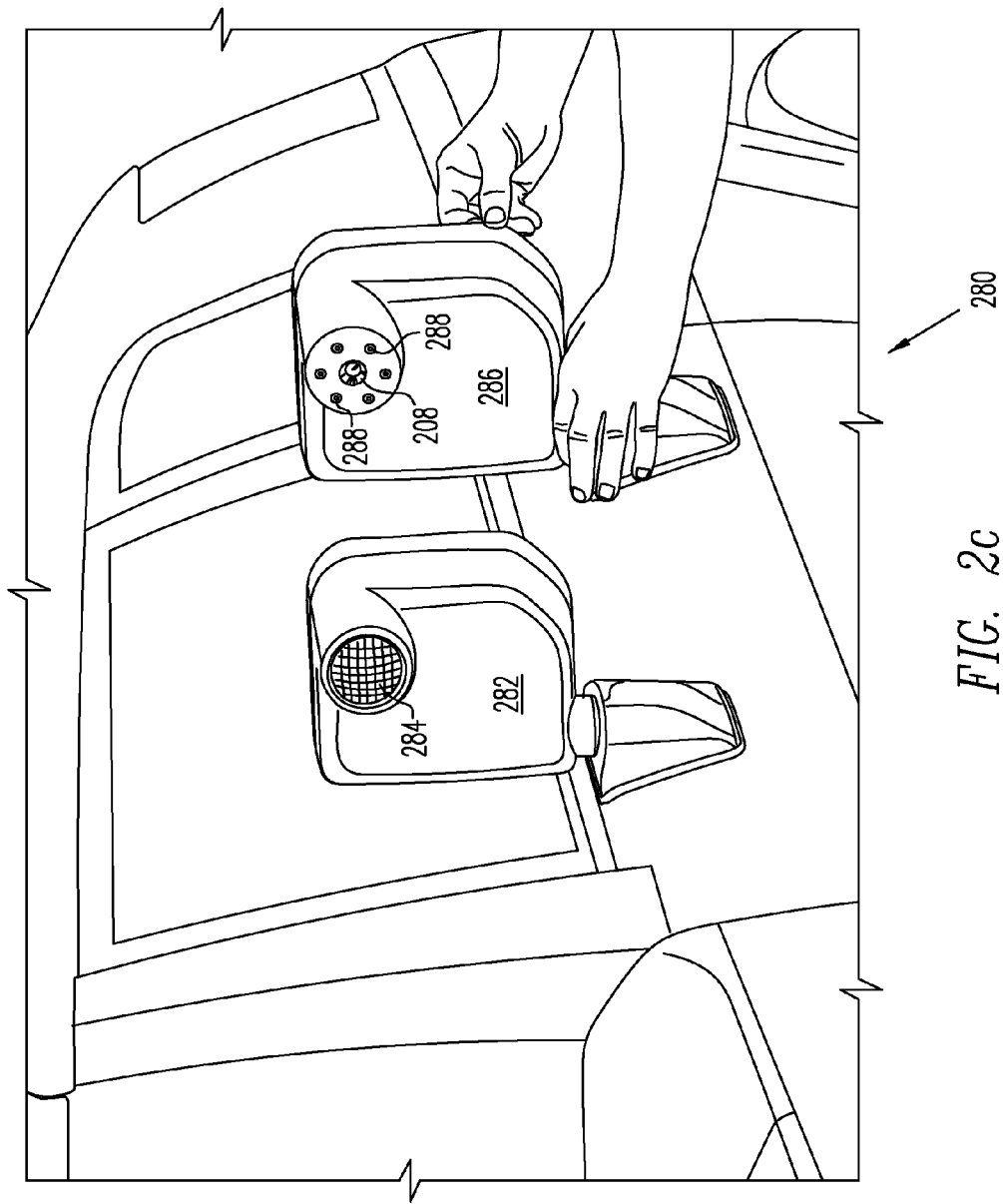
FIG. 2c illustrates a perspective view of a vehicle's side mirror having a light with an integrated infrared camera in accordance with one or more embodiments of the present invention.

As noted, the techniques disclosed herein, such as discussed for lights 200 and 250 (DVE module), may be implemented within common components of vehicles. As a specific example, FIG. 2c illustrates a partial perspective view of a vehicle 280 having a side mirror 282 with a light 284. Also shown in FIG. 2c is an optional side mirror 286 that would replace side mirror 282 on vehicle 280, with side mirror 286 having an infrared camera lens 208 (as part of an infrared camera within side mirror 286) that would receive infrared radiation to display, for example, for occupants of vehicle 280. As an example, light 284 may be implemented, in accordance with one or more embodiments of the present invention, in a similar fashion as discussed for lens 206 (FIG. 2a) or lens 216 (FIG. 2b) to allow infrared radiation to be received by infrared camera lens 208, while providing a reflective or light portion as was provided by light 284. Specifically for example, side mirror 286 may further include one or more light sources 288 (e.g., light-emitting diodes (LEDs)) to provide lighting as desired, with a lens similar to lens 206 or 216 covering light 284 to allow light from light sources 288 to shine through the same lens that is allowing infrared radiation to be received by the infrared camera via infrared camera lens 208. Furthermore, the data from the infrared camera incorporated into light 200, light 250, or side mirror 286 may be transferred to memory or a display within the vehicle via a wired or a wireless interface as would be understood by one skilled in the art and as discussed further herein.

Common components, for example, may be implemented for a number of different types of military vehicles, such as a common turn signal component, which may be selected for integration with an infrared camera system using the techniques disclosed herein and, thus as opposed to some conventional approaches, potentially reducing costs, possibly reusing some of the common components, and maintaining the desired form factor. The integration using the techniques disclosed herein may be viewed as a retrofit or enhancement to an already proven lighting component design, with the common DVE module based on a military-qualified lighting component housing (e.g., using manufacturer approved or original equipment manufacturer approved components).

Figure 3A:
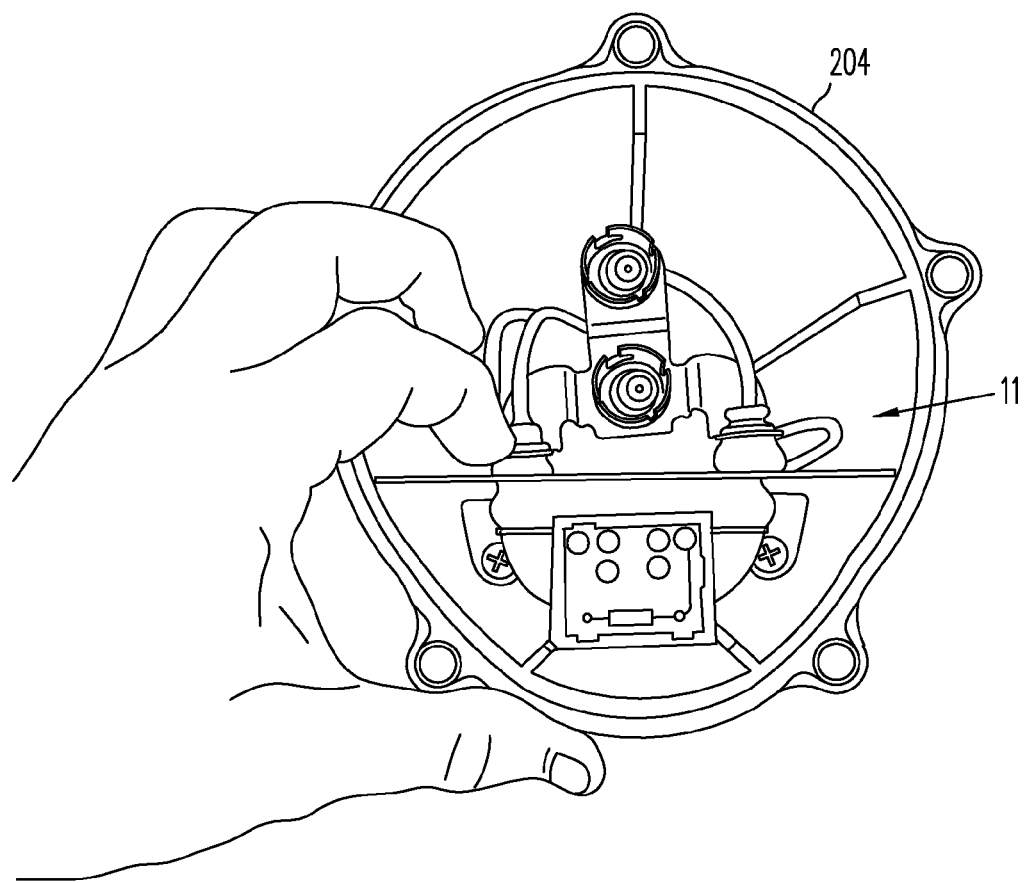
FIGS. 3a and 3b show front views and FIG. 3c show a rear view illustrating operations for integrating an infrared camera into an existing light in accordance with some embodiments of the present invention.
Figure 3B:
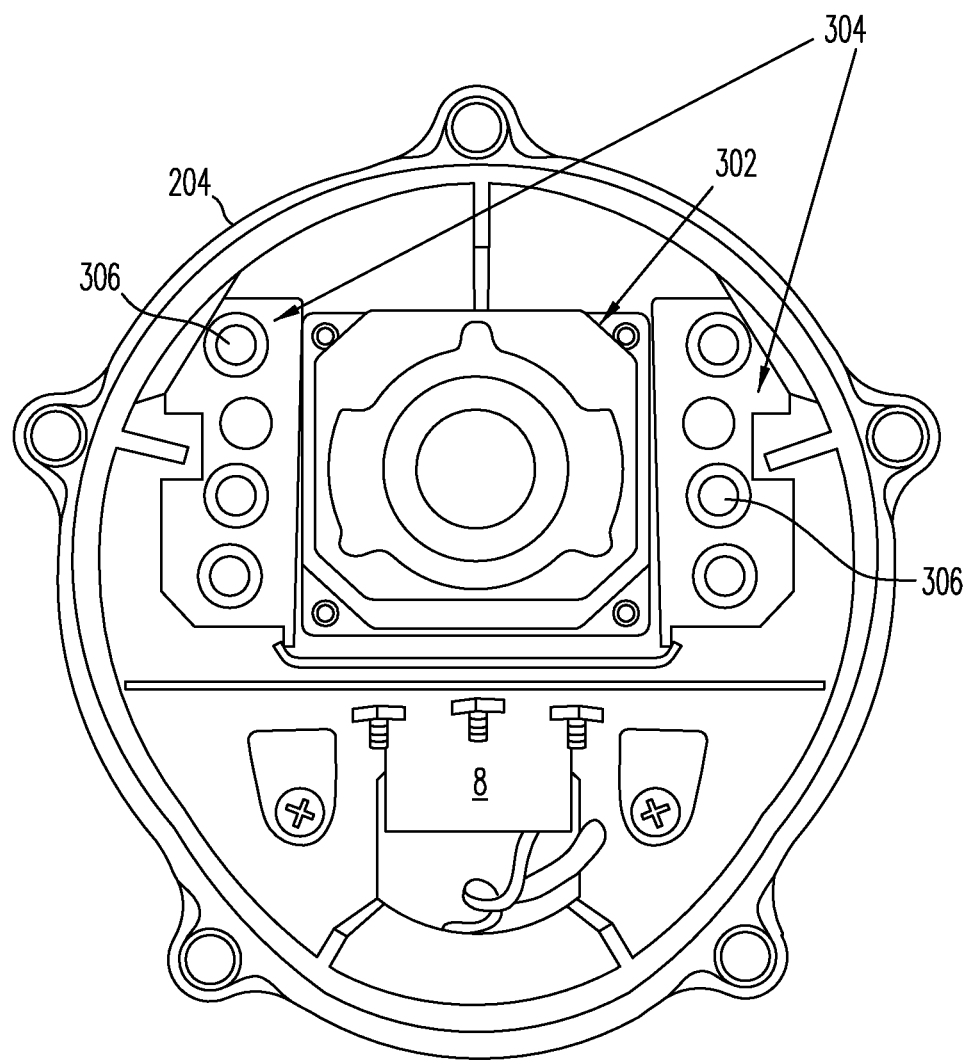
Figure 3C:
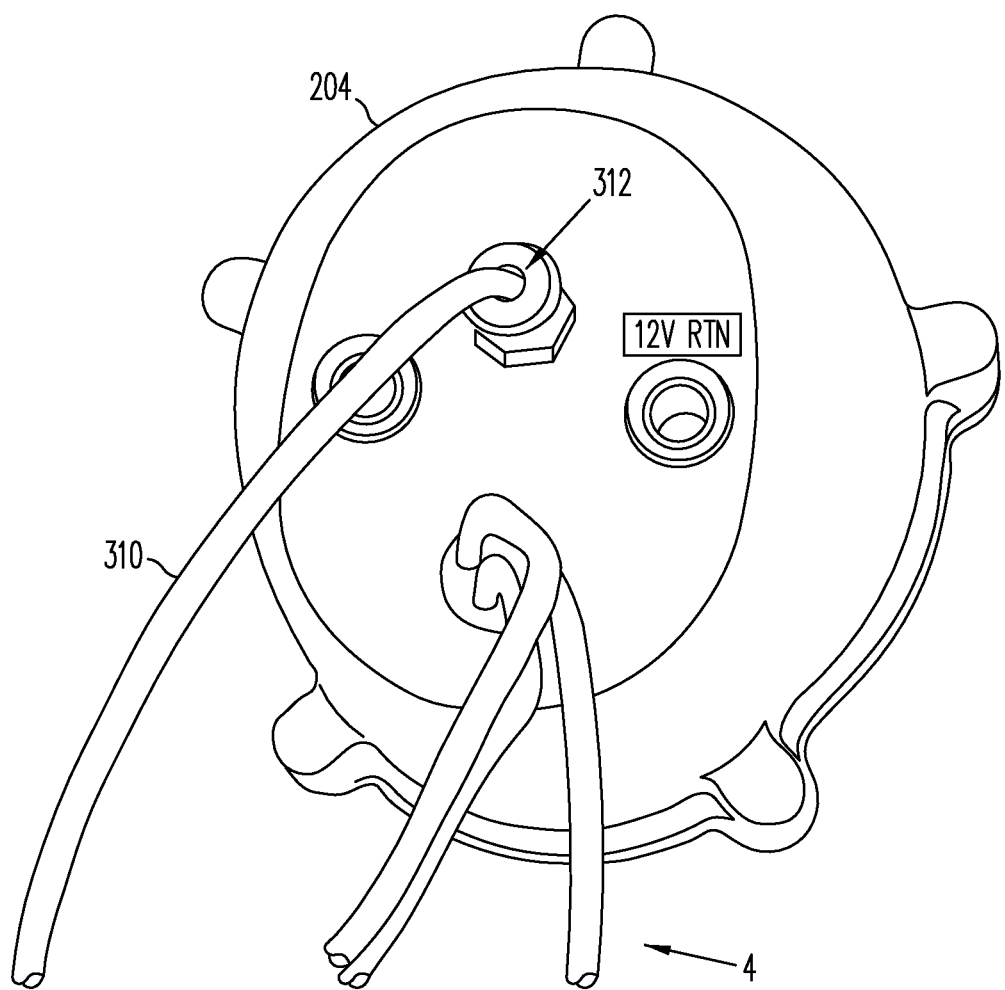

As an example, FIGS. 3a and 3b show front views and FIG. 3c show a rear view illustrating operations for integrating an infrared camera into an existing lighting component (e.g., turn signal light 30 of FIGS. 1a-1c) in accordance with some embodiments of the present invention. As illustrated in FIG. 3a (with lens bracket 9 removed), housing 204 is shown with associated hardware 11 (e.g., light bulb sockets, support brackets, wire terminals, etc.).

The light bulb sockets (including light bulbs 6 and 7) and at least some of the existing associated lighting hardware of hardware 11 may be removed and replaced with an infrared camera 302 (e.g., any type of infrared camera) and alternate light source 304 as shown in FIG. 3b. For example, light source 304 (e.g., having a horse-shoe shaped metal bracket and/or printed circuit board support structure to support infrared camera 302) may have a number of LEDs 306 (e.g., six are shown, but any number may be implemented as required for the particular application) and may further provide an LED circuit card. Light source 304, as an example, may be configured to position LEDs 306 around infrared camera 302 to provide uniform illumination, directional indicators, or other signal lighting as would be understood by one skilled in the art.

Lens bracket 202 (FIGS. 2a-2b) with lens 206 (FIG. 2a) or lens 216 (FIG. 2b) may then be installed onto housing 204 (FIG. 3b) to complete the lighting component assembly as shown in FIGS. 2a and 2b, respectively, to provide a through-the-lens configuration for infrared camera 302 and light source 304. As shown in FIG. 3c, housing 204 provides an outlet for electrical wires 4 and is modified to further provide an outlet (e.g., via a weatherproof grommet 312) for a video cable 310 (e.g., a 75 ohm video cable) for infrared camera 302. Alternatively as discussed further herein, a wireless interface may be substituted for video cable 310.

It should be understood that the DVE module may be implemented by modifying an existing lighting component, in accordance with one or more embodiments discussed herein, or may be designed as a new lighting component that replaces an existing conventional lighting component and that, for example, may maintain the existing lighting components size and shape (e.g., form factor). As an example, infrared camera 302, light source 304, and lens bracket 202 (e.g., with lens 206 or 216) may be designed as a drop-in kit with appropriate mounting brackets or other hardware to secure infrared camera 302 and light source 304 within housing 204. Thus, the DVE module may be easily manufactured and may be easily installed or replaced within a manufacturing facility, service facility, or out in the field.

The DVE module, such as light 200 or light 250, may be installed as one per vehicle or more than one per vehicle to provide a variety of mounting possibilities and the application of various technologies to benefit a driver's ability (or other vehicle occupant's ability) to ascertain their surroundings under a variety of conditions (e.g., enhance regular vision when obscured or limited, such as during low light conditions, weather conditions, or other harsh environments such as battlefield conditions).

For example, one or more infrared camera systems may be integrated into a vehicle to provide various capabilities, such as for example stereoscopic infrared imaging, multi-spectral stereoscopic imaging (e.g., using infrared and visible wavelengths or various infrared wavelengths for multi-color infrared imaging), and/or various fields of view (e.g., foveal imaging). Specifically, FIGS. 4a-4f illustrate various imaging capabilities that may be provided with one or more DVE modules in accordance with embodiments of the present invention.

Figure 4B:
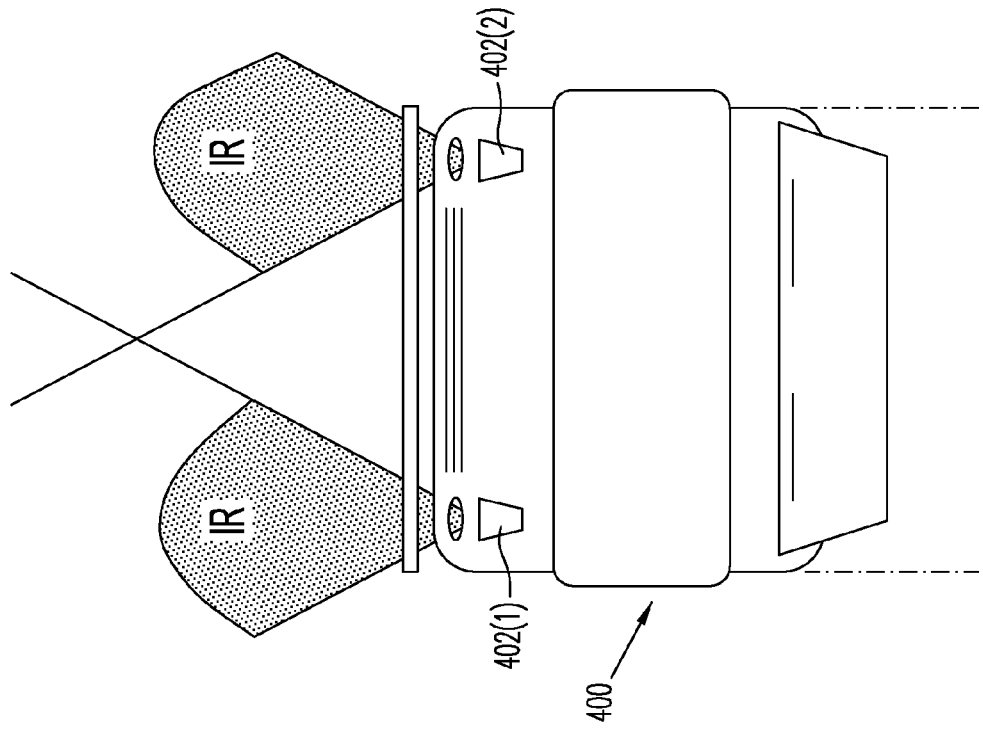
FIGS. 4a-4f illustrate various imaging capabilities that may be provided with one or more lights with integrated infrared cameras in accordance with embodiments of the present invention.
Figure 4A:
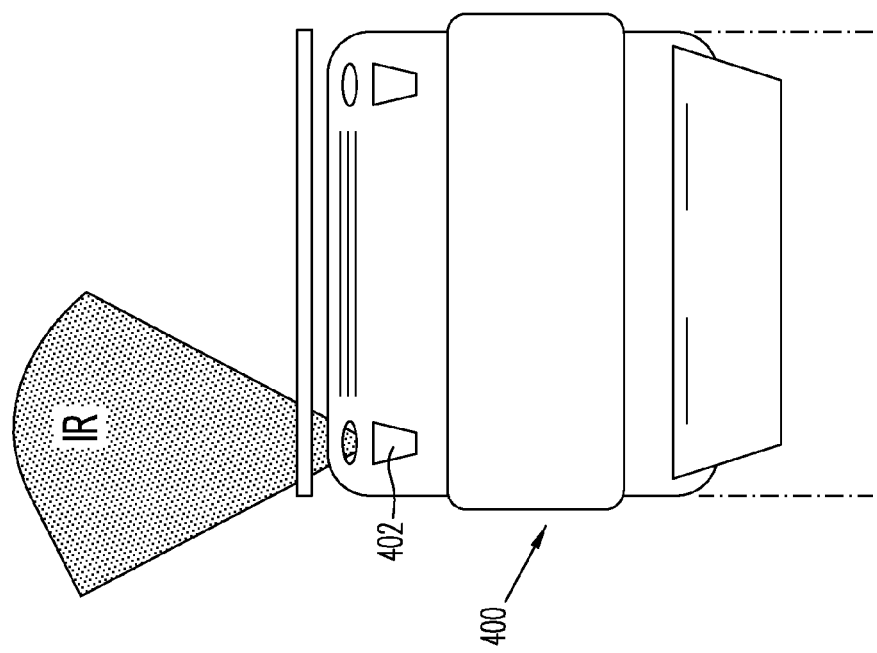

For example, FIG. 4a illustrates an exemplary vehicle 400 equipped with one DVE module 402 (e.g., light 200 or light 250 as a turn signal light implementation or a headlight implementation) in accordance with an embodiment of the present invention. DVE module 402 would receive infrared (IR) radiation (e.g., with an exemplary field of view labeled IR in FIG. 4a) and, for this example and for other examples disclosed herein, provide the corresponding IR images on a display for an occupant (e.g., driver and/or passenger) of vehicle 400 to provide a vision enhancement capability. Furthermore, the IR images may alternatively or may also be stored and/or transmitted to a remote location for viewing and/or storage, as desired for a given application or desired capabilities.

As another example, FIG. 4b illustrates vehicle 400 equipped with two DVE modules 402 (labeled as DVE modules 402(1) and 402(2)) in accordance with an embodiment of the present invention. For this example, DVE modules 402(1) and 402(2) are installed forward looking on vehicle 400 and may provide overlapping IR field of views, which may be used to provide stereoscopic IR imaging for depth perception and three-dimensional forward visibility.

Figure 4D:
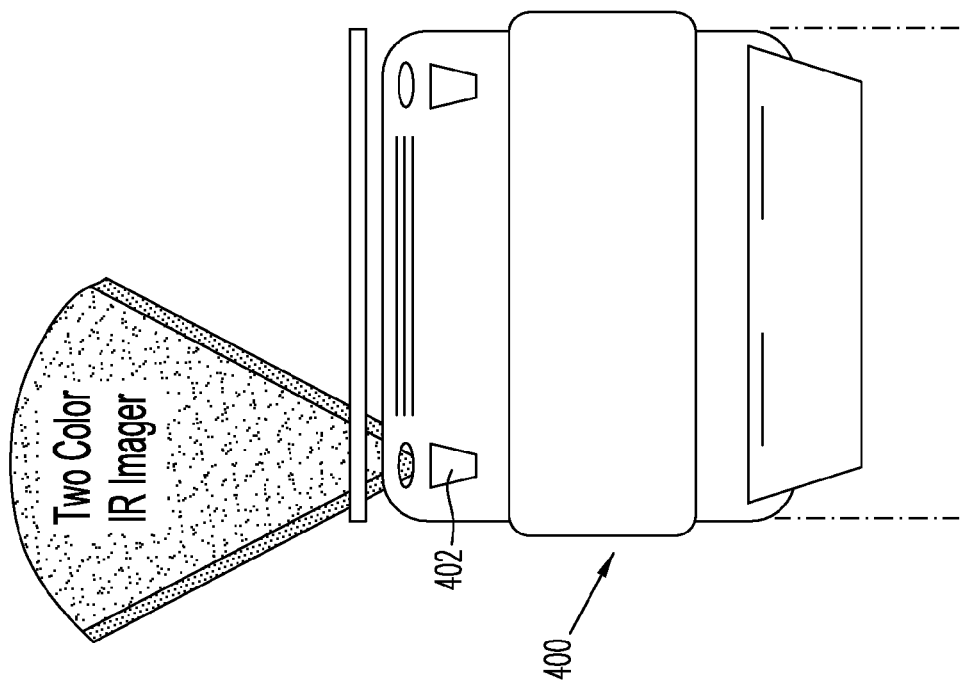
Figure 4C:
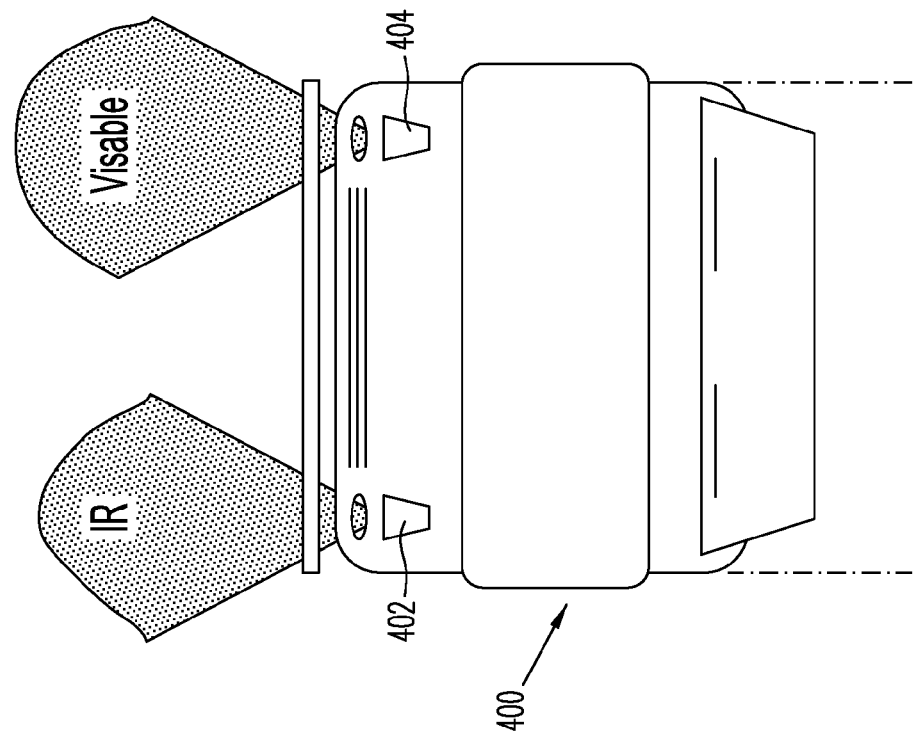

As another example, FIG. 4c illustrates vehicle 400 equipped with one DVE module 402 along with a camera 404 providing images from a visible spectrum in accordance with an embodiment of the present invention. For this example, the two technologies (i.e., IR and visible wavelength-sensitive cameras) may complement each other and provide enhanced views of the viewing area, including multi-spectral stereoscopic imagery.

As another example, FIG. 4d illustrates vehicle 400 equipped with one DVE module 402 that provides two-color infrared images (e.g., infrared camera 302 has two-color IR detection capability) in accordance with an embodiment of the present invention. As shown in FIG. 4e, vehicle 400 may also be equipped with two DVE modules 402, with for example DVE module 402(1) providing IR images in one IR band (e.g., IR band 1) and DVE module 402(2) providing IR images in another IR band (e.g., IR band 2 covering at least some different wavelengths than IR band 1). Thus, DVE modules 402 may provide two-color imaging or stereoscopic imaging using the two color spectrum imagery provided by DVE modules 402(1) and 402(2).

Figure 4F:
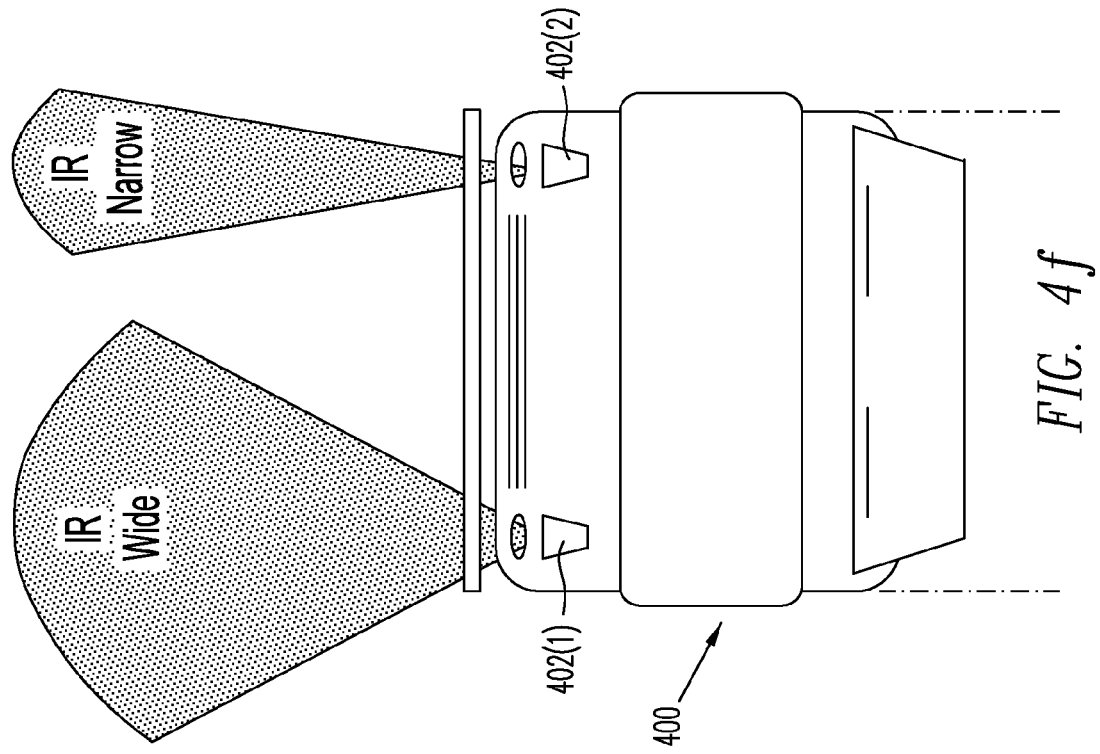
Figure 4E:
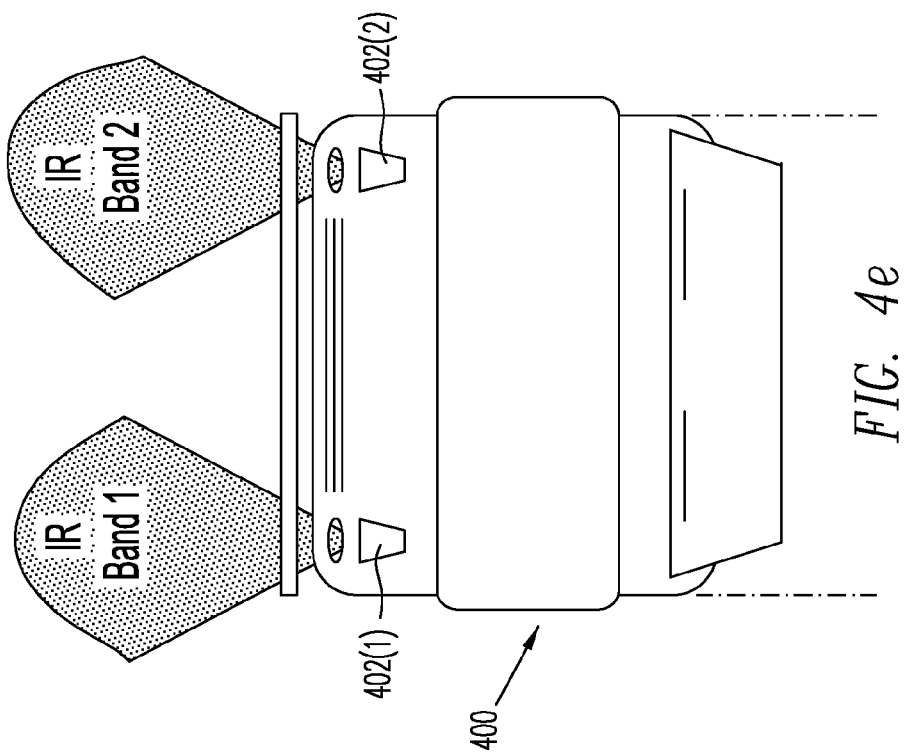

As another example, FIG. 4f illustrates vehicle 400 equipped with DVE modules 402(1) and 402(2) in accordance with an embodiment of the present invention. For this example, DVE modules 402(1) and 402(2) provide wide and narrow field of views, respectively, to provide enhanced vision capability. As an example, DVE modules 402(1) and 402(2) may be used to provide a foveal image, with DVE module 402(2) providing a more detailed view (e.g., either statically in a fixed position or by pointing DVE module 402(2) to a desired area of interest) for a portion of the view provided by DVE module 402(1).

One or more of DVE modules 402, such as shown in FIGS. 4a-4f, may be implemented with a narrow FOV (long-range optics) rather than a wide FOV. For example, as illustrated in FIG. 4f, DVE module 402(2) may be implemented with long-range optics having a narrow FOV. Furthermore, DVE module 402(2) may then, for example, be mechanically-driven and controlled to view a point of interest within the FOV of one or more of the other DVE modules 402 incorporated into vehicle 400.

In general in accordance with some embodiments, vehicle 400 may be configured with one or more DVE modules 402 to provide various field of views and/or various types of views across various portions of the electromagnetic spectrum. The information provided by DVE modules 402 may be displayed and/or stored within vehicle 400 and/or transmitted to another location for display/storage, as desired for the particular application or requirements.

As a specific example for a field of view (FOV), each DVE module 402 may have a 110° FOV to cover a wide area of interest.

By implementing two DVE modules 402 within vehicle 400, a field of view greater than 180° (e.g., 220° FOV) may be provided. As a specific implementation example, DVE module 402 may be an infrared camera that includes a focal plane array having an uncooled vanadium oxide (VOX)-based microbolometer, with a 320 by 124 format, 38 μm pixel size, 7.5 to 13.5 μm spectral response, a 60 Hz frame rate, logarithmic automatic gain control, and an f/1.2 aperture. Thus, the two DVE modules 402 within vehicle 400 may provide approximately 180° horizontal FOV by 43° vertical FOV (640 by 124 format), with an estimated detection range (on-axis) of 150 m for a person and 200 m for an automobile.

With a 320 by 124 format for the focal plane array, high resolution across a wide horizontal FOV is provided, which for many applications would be desirable. However, if high resolution with a large vertical FOV is required, DVE module 402 may be rotated 90° or may be implemented with, for example, a 124 by 320 format for its focal plane array or a format suitable for the desired application.

DVE module 402 may also include an image processor, such as a digital image processor or an image compressor/processor. Alternatively, the image processor may be included in vehicle 400, such as within a computer system within vehicle 400 that may also serve to display images from DVE modules 402. As described further herein, the image processor may provide motion detection, dynamic range adjustments, and other camera control and/or image manipulation functions.

The information from DVE module 402 may be displayed and/or recorded on an external device (e.g., a display, a computer, or other type of device capable of storing and/or displaying information with in vehicle 400). As an example and as discussed further herein, the information from DVE modules 402 may be displayed separately (e.g., information from DVE module 402(1) and 402(2) displayed on the top half and the bottom half, respectively, of the display). Alternatively, the information from DVE module 402(1) and 402(2) may be merged (e.g., stitched) and displayed as a merged image (e.g., a seamless panoramic view on the display to display the complete field of view covered by DVE modules 402). As an example, the images provided by DVE modules 402 may be provided in corresponding areas of a display, one or more of the images may be merged together to form corresponding panoramic views on the display, and/or the images may be viewed sequentially or randomly from DVE modules 402 on the display.

The panoramic image may be formed via image processing technologies to combine an image from DVE module 402(1) with an image from DVE module 402(2) to provide a seamless FOV greater than 160°. The same technique may be applied to images from a number of DVE modules 402 to provide, for example, an image having a FOV up to 360°. Furthermore, a single image formed from multiple images may provide certain advantages, such as common features or controls (e.g., automatic gain control (AGC), image processing, contrast, and/or synchronization), over that of displaying multiple images.

The panoramic image may be displayed over the entire screen area of the display screen or over a designated portion of the display screen. For example, a portion of the panoramic image may be designated and displayed as a higher resolution image on a portion of the display screen or over the entire screen area of the display screen in accordance with an embodiment of the present invention.

The higher resolution image, for example, may be provided via image processing techniques to zoom in on a portion of the panoramic image. Alternatively, as discussed previously, a higher resolution camera (e.g., DVE module 402(2) of FIG. 4f as discussed herein) may be directed to the point of interest to provide the higher resolution image. The computer (e.g., a video processor, an image processor, or a digital image processor) may provide data or image manipulation, such as stitching or merging of the data from DVE modules 402, split screen or panoramic images from DVE modules 402, motion detection, slew to queue (e.g., to direct one or more narrow FOV cameras), and digital zoom. Furthermore, the computer may allow user controlled or automatic gain control for single images or multiple combined images along with contrast, synchronization, and other image processing options.

As an additional implementation example, DVE modules 402 may provide wide and narrow fields of view simultaneously in a foveal presentation. An operator may select the narrow field of view to be located and displayed within the wide field of view's display area or an operator may select different views to be provided (e.g., a wide field of view, a narrow field of view, or the combination of the wide and narrow field of views). Additionally, two or more DVE modules 402 may be used in any desired combination of types. For example, DVE module 402(1) (e.g., wide field of view infrared camera), DVE module 402(2) (e.g., narrow field of view infrared camera), and a visible light wide field of view camera may be used incorporated into vehicle 400. The foveal image can then be formed by simultaneously displaying images from the infrared narrow field of view within the wide field of view display for either the wide field of view infrared camera or the wide field of view visible light camera.

In accordance with some embodiments of the present invention, the foveal images can comprise any desired combination of parameters. Examples of parameters include color balance, color fusion, compression (type and/or rate), contrast, edge enhancement, encoding, field of view, focus (auto versus manual focus and/or sharp versus fuzzy focus), frame rate, illumination (e.g., passive/active), intensity (brightness), magnification, phase, polarization, spectrum (e.g., visible, infrared, and/or other electromagnetic regions), warping, and/or image stabilization. That is, the narrow field of view or smaller image may vary with respect to the wide field of view or larger image in any parameter or combination of parameters that one image may vary in with respect to another image.

Furthermore, more than one narrow field of view may be displayed within the wide field of view display. For example, two, three, four, or more narrow fields of view, such as from a corresponding number of narrow field of view DVE modules 402, may be displayed within the wide field of view display from one or more DVE modules 402. The wide field of view display and each of the narrow field of view displays may, for example, have any desired combination of the noted parameters.

Figure 5:
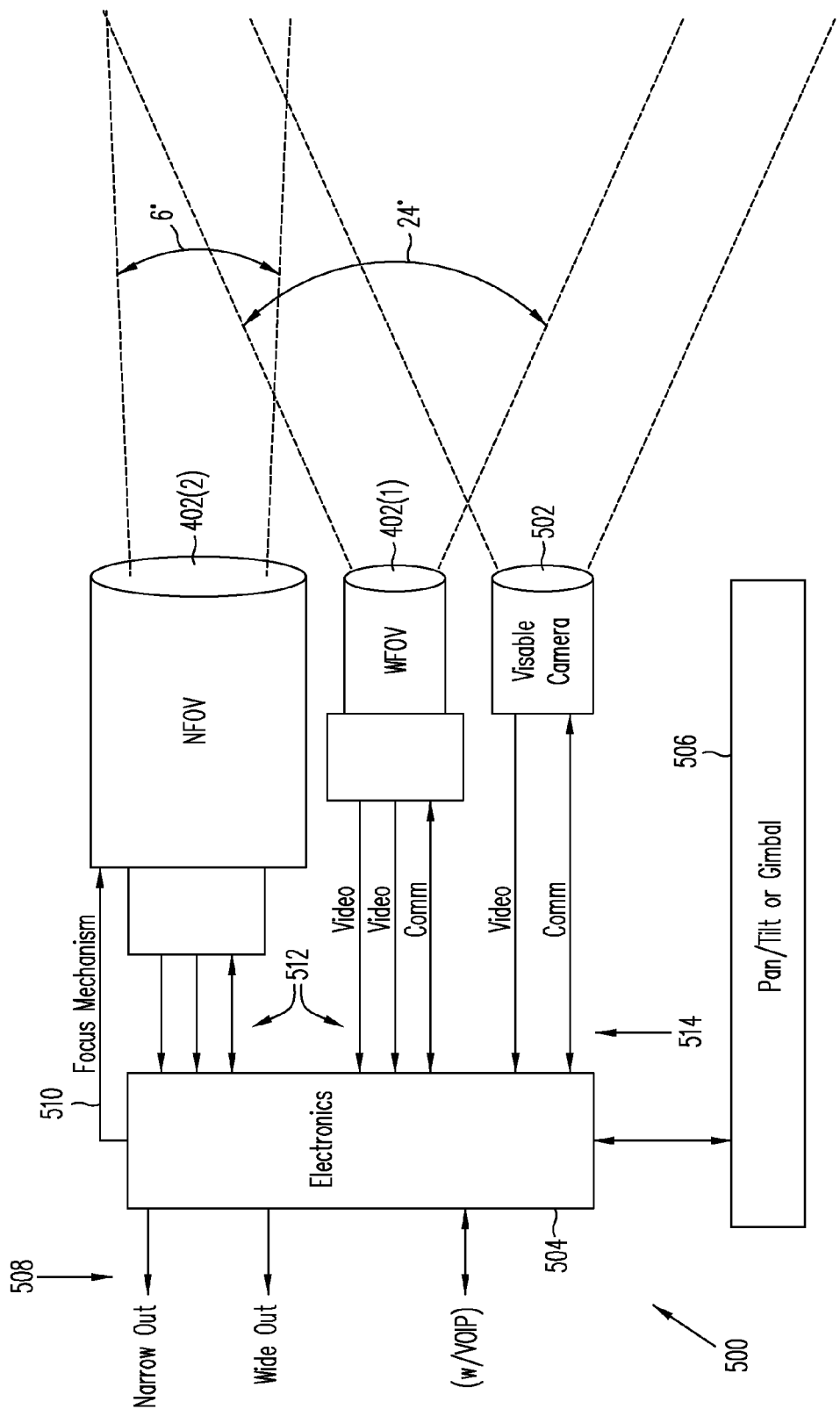
FIG. 5 illustrates a block diagram of a camera system for a vehicle in accordance with one or more embodiments of the present invention.

As a specific implementation example, FIG. 5 shows a block diagram illustrating a camera system 500 for a vehicle that may be used to provide images (e.g., foveal, multi-spectral, and/or stereoscopic images) in accordance with some embodiments of the present invention. Camera system 500 includes DVE modules 402(1) and 402(2), a camera 502 (e.g., visible light camera), system electronics 504, and an optional directional control 506. Camera system 500 may be incorporated into a vehicle to provide views of a desired area.

DVE modules 402(1) and 402(2) include infrared cameras, as discussed herein, while camera 502 may represent an optional camera for providing images in the visible electromagnetic spectrum. For example, DVE module 402(2) may provide a NFOV (e.g., a field of view of approximately 6 degrees), DVE module 402(1) may provide a WFOV (e.g., a field of view of approximately 24 degrees), and camera 502 may provide a FOV based on a normal lens (e.g., 50 mm focal length), a wide angle lens (e.g., 18 mm focal length), a telephoto lens (e.g., 200 mm focal length) or a vari-focal or zoom lens.

DVE modules 402(1) and 402(2) and camera 502 may be aligned so that their field of views overlap or are centered (e.g., boresight) at approximately the same area for a given distance. Alternatively, optional directional control 506 (e.g., a pan/tilt directional control) allows a user to control the focal direction or orientation of one or more portions of camera system 500. For example, directional control 506 allows a user to manually direct or point DVE module 402(2) in a direction of interest by the user issuing commands to camera system 500. Directional control 506 may also be automated to scan DVE module 402(2) repeatedly or randomly over an area of interest. Furthermore, directional control 506 may also optionally be implemented to control DVE modules 402(1), 402(2), and/or camera 502 individually so that each may be independently controlled and pointed in a desired direction. For example, DVE modules 402(1), 402(2), and/or camera 502 may be mounted on motorized mounts to rotate for a desired view or alternatively the infrared cameras within DVE modules 402(1) and/or 402(2) may be rotated or otherwise directed to an area of interest.

System electronics 504 (e.g., a logic device, ASIC, and/or computer or other processor-based system), for example, receives or provides various interface signals 508, 510, 512, and/or 514 for camera system 500. Interface signals 508 may represent or include various control signals (e.g., Pelco-D protocol control signals) to and from camera system 500 and data signals, such as for example data from DVE module 402(2) (e.g., narrow analog out data), DVE module 402(1) (e.g., wide analog out data), and camera 502. Interface signals 508 may be communicated via a wireless or a wired interface (e.g., communication system, such as a data bus of vehicle 400).

System electronics 504 may control directional control 506 as well as camera 502 and DVE modules 402(1) and 402(2). For example, system electronics 504 may control the focus of DVE module 402(2) (e.g., via a focus mechanism control signal 510).

System electronics 504 generally receives data signals (e.g., analog and/or digital video) from DVE modules 402(1), 402(2), and camera 502 and transfers communication (comm) signals to and from DVE modules 402(1), 402(2), and camera 502 via interface signals 512 and 514.

As an example, the image provided by DVE module 402(2) may be inserted onto the image provided by DVE module 402(1) to display the image provided by DVE module 402(2) centered within or otherwise positioned with respect to the image provided by DVE module 402(1) to provide a foveal image. This type of imaging may provide certain advantages, as the wide field may be used for situational awareness and the narrow field may be used for target identification to provide a combined scene that requires lower data amounts and may be transmitted at lower bandwidth than the full high-density image (e.g., a form of video compression techniques). Thus, video transmission efficiencies may be provided by combining a wide field scene having a comparatively lower resolution with a narrow field scene having a comparatively higher resolution. The resultant composite foveal image may require less storage space and transmission bandwidth than would be required than the wide field scene created with the comparatively higher resolution.

For example, by providing multiple infrared cameras and corresponding optics, improved performance and flexibility may be achieved, while increasing reliability and redundancy (e.g., for high reliability or mission critical applications). Reliability may be increased due to fewer/simpler mechanical systems or fewer moving parts. For example, a field of view change mechanism for a camera is not required and a focus mechanism may be applicable for only the narrow field of view camera. The power surge requirements may also be reduced due to the field of view change mechanism being eliminated. Furthermore, redundancy improves reliability. For example, if one camera fails, the other camera will still operate and, therefore, the probability of total camera system loss decreases (e.g., total image loss probability is reduced due to multiple camera apertures).

The camera system, in accordance with an embodiment of the present invention, may offer wide and narrow fields of view simultaneously to provide situational awareness (e.g., with the wide field of view) and long detection or recognition ranges (e.g., with the narrow field of view) simultaneously and with reduced required transmission bandwidth. Multiple operators may have simultaneous access to different views from the camera system having the wide and narrow field of view cameras.

Furthermore, there may be zero or minimal latency when switching between fields of view. For example, this benefit may reduce or eliminate loss of track problems that may generally occur with single camera systems when an operator or an auto tracker program must wait during the transition (e.g., two seconds) from one field of view to another. In addition, auto tracker programs can continue to track in the wide field of view, while an operator switches to the narrow field of view for a closer inspection, with no loss of track because the wide field of view image is maintained. If the auto tracker program switches to the narrow field of view, the probability of a loss of track is greatly diminished because there is little or no delay in viewing the selected field of view. Therefore, instantaneous field of view switching and foveal viewing modes may reduce or eliminate problems associated with conventional cameras.

Additionally in accordance with some embodiments of the present invention, the data from DVE modules 402 (e.g., of FIGS. 4a-4f or FIG. 5) and/or the data from camera 502 may be processed by software algorithms to detect anomalies (e.g., various types of hazards) and may provide a warning to an occupant of the vehicle (e.g., vehicle 400). For example, the data may be processed (e.g., by system electronics 504) from DVE modules 402 to detect for an animal or person or other anomaly in the direction of travel of the vehicle that incorporates DVE modules 402. Furthermore for example, based upon the detection of the anomaly, an audible warning and/or change in display screen (e.g., color marking of the anomaly) may be provided to alert the driver or other vehicle occupant of the detected anomaly so that a proper course of action (e.g., collision avoidance) may be taken.

Systems and methods are disclosed in accordance with one or more embodiments of the present invention for integrating infrared camera systems into various types of vehicles. For example in accordance with an embodiment, an infrared camera system is disclosed that is adapted to be incorporated into a vehicle component (e.g., an existing light or reflector) to provide a through-the-lens imaging approach that may be field installable and replaceable. Furthermore, one or more infrared camera systems may be integrated into a vehicle to provide various capabilities, such as for example stereoscopic infrared imaging, multi-spectral stereoscopic imaging (e.g., using infrared and visible wavelengths or various infrared wavelengths for multi-color infrared imaging), and/or various fields of view (e.g., foveal imaging).

Embodiments described above illustrate but do not limit the invention. It should also be understood that numerous modifications and variations are possible in accordance with the principles of the present invention. Accordingly, the scope of the invention is defined only by the following claims.

What is claimed is:

1. A lighting component for a vehicle, the lighting component comprising:
   a housing;
   a thermal infrared camera disposed within the housing;
   a light source, disposed within the housing and disposed at least partially around the thermal infrared camera, to provide visible light; and
   a lens coupled to the housing and adapted to allow external thermal infrared radiation to pass through and be received by the thermal infrared camera and to allow the visible light provided by the light source to be transmitted through the lens;
   wherein the thermal infrared camera has a first field of view and is adapted to provide thermal image data, and wherein the thermal infrared camera comprises a focal plane array having uncooled microbolometers that are sensitive to infrared radiation in approximately 7.5 to 13.5 micrometer wavelengths, the focal plane array having a different number of pixels in a horizontal direction relative to a vertical direction to provide the thermal image data for the desired first field of view.

2. The lighting component of claim 1, wherein a portion of the lens comprises an infrared window to pass through thermal infrared radiation.

3. The lighting component of claim 1, wherein a portion of the lens comprises an opening with a weatherproof seal between the lens and the thermal infrared camera.

4. The lighting component of claim 1, further comprising a lens bracket adapted to secure the lens to the housing to completely enclose the thermal infrared camera and the light source within the housing.

5. The lighting component of claim 4, further comprising a blackout reflector disposed within the housing, wherein the lens bracket further comprises a blackout window for the blackout reflector, and wherein a position of the blackout window is maintained in an approximately same position to that of a conventional version of the lighting component that does not include the thermal infrared camera.

6. The lighting component of claim 1, wherein the light source comprises a plurality of light-emitting diodes.

7. The lighting component of claim 1, wherein the lighting component is formed as a portion of a side view mirror.

8. The lighting component of claim 1, wherein the lighting component comprises a turn signal light, a headlight, a taillight, a spotlight, a fog light, a running light, an accessory light, or a safety light.

9. The lighting component of claim 1, wherein the vehicle comprises a ground vehicle, a watercraft, or an aircraft.

10. A vehicle having at least one lighting component, the lighting component comprising:
    a housing;
    a thermal infrared camera disposed within the housing;
    means disposed within the housing and adjacent to the thermal infrared camera for providing light; and
    means for enclosing the housing, wherein the enclosing means includes a lens adapted to allow external thermal infrared radiation through to be received by the thermal infrared camera and to allow visible light generated by the light providing means to be transmitted through the lens;
    wherein the thermal infrared camera has a first field of view and is adapted to provide thermal image data, and wherein the thermal infrared camera comprises a focal plane array having uncooled microbolometers that are sensitive to infrared radiation in approximately 7.5 to 13.5 micrometer wavelengths, the focal plane array having a different number of pixels in a horizontal direction relative to a vertical direction to provide the thermal image data for the desired first field of view.

11. The vehicle of claim 10, wherein the lighting component further comprises a blackout reflector disposed within the housing, and wherein the enclosing means further includes a blackout window for the blackout reflector such that a position of the blackout window is maintained in an approximately same position to that of a conventional version of the lighting component that does not include the thermal infrared camera.

12. The vehicle of claim 10, wherein the lighting component is formed as a portion of a side view mirror.

13. The vehicle of claim 10, wherein the lighting component comprises a turn signal light, a headlight, a taillight, a spotlight, a fog light, a running light, an accessory light, or a safety light, and wherein the vehicle comprises a ground vehicle, a watercraft, or an aircraft.

14. The vehicle of claim 10, wherein the vehicle has a plurality of the lighting components, and wherein the vehicle further comprises:
- a display for viewing infrared image data provided by the thermal infrared cameras of the lighting components; and
- system electronics adapted to process the infrared image data and provide to the display for viewing.

15. The vehicle of claim 14, wherein the infrared image data provided by the lighting components is processed by the system electronics to provide stereoscopic infrared images for viewing on the display.

16. The vehicle of claim 14, wherein the infrared image data provided by the lighting components is processed by the system electronics to provide multi-spectral stereoscopic infrared images for viewing on the display.

17. The vehicle of claim 16, further comprising a camera adapted to provide image data from a visible spectrum, and wherein the system electronics is further adapted to process the image data and provide to the display for viewing on the display.

18. The vehicle of claim 14, wherein the infrared image data provided by the lighting components is processed by the system electronics to provide foveal images for viewing on the display.

19. The vehicle of claim 14, wherein the infrared image data provided by the lighting components is processed by the system electronics to provide panoramic images for viewing on the display.

20. A method of reconfiguring an existing vehicle component to provide a driver vision enhancer module, the method comprising:
- removing an existing lens from a housing of the existing vehicle component;
- removing any existing lighting components and associated hardware from the housing;
  - installing in the housing a thermal infrared camera along with one or more light sources, adjacent to the thermal infrared camera, to provide visible light; and
  - securing a lens to the housing, wherein the lens is adapted to allow external thermal infrared radiation to pass through and be received by the thermal infrared camera and to allow the visible light provided by the light sources to be transmitted through the lens;
  - wherein the thermal infrared camera has a first field of view and is adapted to provide thermal image data, and wherein the thermal infrared camera comprises a focal plane array having uncooled microbolometers that are sensitive to infrared radiation in approximately 7.5 to 13.5 micrometer wavelengths, the focal plane array having a different number of pixels in a horizontal direction relative to a vertical direction to provide the thermal image data for the desired first field of view.

21. The method of claim 20, wherein the light sources at least partially encircle the thermal infrared camera, and wherein the securing includes securing a lens bracket to the housing, wherein the lens bracket includes a blackout window for a blackout reflector disposed within the housing, wherein the lens has an approximately same size relative to the existing lens, and the blackout window is disposed below the lens in approximately a same position as previously to the existing lens.

22. The method of claim 20, wherein the existing vehicle component is a side view mirror.

23. A method of providing infrared imaging capability for a vehicle, the method comprising:
- providing one or more lighting components on the vehicle, wherein the lighting component comprises:
  - a thermal infrared camera,
  - a light source adjacent to the thermal infrared camera to provide visible light,
  - a lens adapted to allow external thermal infrared radiation through to be received by the thermal infrared camera and to allow the visible light generated by the light source to be transmitted through the lens, and
  - a housing, wherein the thermal infrared camera and the light source are within the housing and the lens is secured to the housing with a lens bracket;
  - wherein the thermal infrared camera has a first field of view and comprises a focal plane array having uncooled microbolometers that are sensitive to infrared radiation in approximately 7.5 to 13.5 micrometer wavelengths, the focal plane array having a different number of pixels in a horizontal direction relative to a vertical direction to provide the desired first field of view;
- processing infrared image data from the thermal infrared camera to provide processed infrared image data; and
- displaying the processed infrared image data to an occupant of the vehicle.

24. The method of claim 23, further comprising transmitting the processed infrared image data to a remote location from the vehicle, and wherein the lighting component comprises a blackout reflector, within the housing, and the lens bracket includes a blackout window disposed over the blackout reflector, wherein a position of the blackout window is maintained in an approximately same position to that of a conventional version of the lighting component that does not include the thermal infrared camera.

25. The method of claim 23, wherein the lighting component is formed as a portion of a side view mirror.

26. The method of claim 23, wherein the processed infrared image data provides stereoscopic infrared images for the displaying.

27. The method of claim 23, wherein the processed infrared image data provides multi-spectral stereoscopic infrared images for the displaying.

28. The method of claim 23, further comprising providing a camera on the vehicle to provide image data from a visible spectrum region, and wherein the processing processes the image data for the displaying.

29. The method of claim 23, wherein the processed infrared image data provides foveal images for the displaying.

30. The method of claim 23, wherein the processed infrared image data provides panoramic images for the displaying.

* * * * *